United States Patent [19]

Miller

[11] 4,140,952
[45] Feb. 20, 1979

[54] OFFSET COMPENSATED ELECTRONIC CURRENT SENSOR AND CONTROLLER

[75] Inventor: Kenneth L. Miller, Madison, Ala.

[73] Assignee: Chrysler Corporation, Highland Park, Mich.

[21] Appl. No.: 780,381

[22] Filed: Mar. 23, 1977

[51] Int. Cl.² .............................................. H02P 1/18
[52] U.S. Cl. .................................... 318/478; 318/267; 307/131
[58] Field of Search ............... 318/266, 267, 278, 296, 318/297, 478, 479; 307/125, 131, 140

[56] References Cited

U.S. PATENT DOCUMENTS

| 2,810,778 | 10/1957 | Manty et al. | 318/478 X |
| 3,143,696 | 8/1964 | Harris | 318/266 |
| 3,305,765 | 2/1967 | Rittner | 318/478 X |
| 3,465,208 | 9/1969 | Patrickson et al. | 307/131 X |

Primary Examiner—Robert K. Schaefer
Assistant Examiner—W. E. Duncanson, Jr.
Attorney, Agent, or Firm—Baldwin & Newtson

[57] ABSTRACT

An offset compensated electronic current sensor and controller for automatically controlling the extension and retraction of a power antenna with the energization and de-energization of an automobile electronic search tune radio receiver.

17 Claims, 2 Drawing Figures

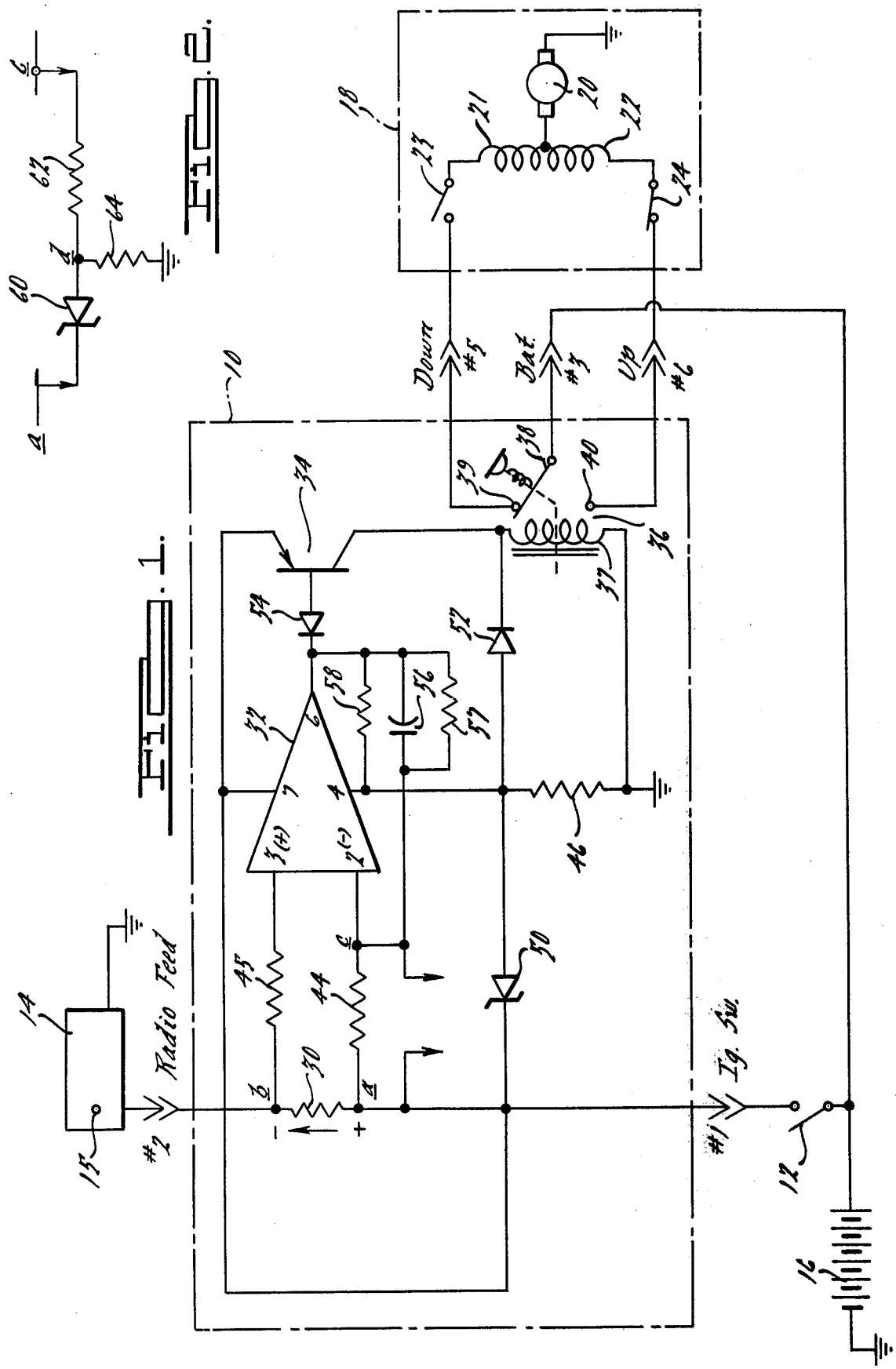

OFFSET COMPENSATED ELECTRONIC CURRENT SENSOR AND CONTROLLER

BACKGROUND

This invention relates generally to electronic current sensing controllers for sensing the energization of a load or first electrical utilization device and controlling the operation of a second utilization device remotely located from the first device. More particularly, the invention relates to a compensated electronic current sensor-controller device suitable for use with bilevel energization forms of utilization devices which have a standby operational mode requiring a finite or first level of current to condition or prepare it for operation at a different and usually higher current level upon subsequent activation of the device.

The controller of the present invention is designed to discriminate against or to be unresponsive to the initial current level of the utilization device and to respond only to the higher level of current drawn upon activation thereof and in this respect is an improvement upon the current sensor and controller of Copending United States Patent Application USSN 780,380, filed of even date and of common ownership herewith.

The above and other objects, features and advantages of the invention, together with the structural composition and functional operation thereof, will appear from consideration of the following detailed description made with respect to the accompanying drawings of which FIG. 1 is a schematic electrical circuit of an uncompensated form of electronic current sensor and controller suitable for use with utilization devices which require no current draw in the unactivated state of the utilization device, and FIG. 2 is an electrical schematic of an offset compensation circuit for use with the controller of FIG. 1 with utilization devices which may draw a standby operating current in the unactivated state thereof.

With reference to the drawings, the controller 10 of FIG. 1 is shown as a five terminal, case grounded structure having a pair of input terminals and three output or switching terminals. Terminals #1 and #2 constitute the input terminals of the controller and are respectively connected to the load side of the battery-fed vehicle ignition switch 12 and to the B+ radio feed or main supply terminal of the radio receiver which is shown at 14 as having a chassis ground return to the other or negatively grounded side of the vehicle battery 16. Terminals #3, #5, and #6 constitute the output or the switching terminals of the controller of which terminal #3 is connected to the positive side or high potential terminal of the vehicle battery 16 and terminals #5 and #6 are respectively connected to a second utilization device in the form of a reversible motor driven power extensible and retractable antenna unit, shown at 18.

The unit 18 is a commercially available antenna unit as manufactured by the Tenna Corporation of Cleveland, Ohio, for example, and includes a D.C. drive motor 20 having a "down" field winding 21 and an "up" field winding 22. Windings 21 and 22 are respectively connected to the "down" and "up" input terminals of the unit 18 through antenna position responsive or activated internal limit switches 23 and 24 of which switch 23 is open and switch 24 is closed when the antenna is fully retracted and visa versa when the antenna is fully extended.

Internally, the controller 10 comprises basically a current sensor 30, an operational amplifier 32, an output switching control or relay driver transistor 34 and a control relay 36 having a relay coil 37, which operates a set of normally closed 38, 39 and a set of normally open 38, 40 switch contacts. The relay is depicted in its de-energized condition with its contacts in the position shown in which the directly battery fed output terminal #3 of the controller is connected through the movable relay contact 38 to the back contact 39 of the relay and then to the "down" output terminal #5 of the controller, which is connected to the "down" field coil 21 through limit switch 23 of the motorized antenna unit 18.

The current sensor 30 is a resistor of low ohmic value, say 0.25 ohms having a 5 watt power rating, and is connected from its opposite sides or ends, labelled a, b, through resistors 44 & 45 to the inverting (−) and to the non-inverting (+) signal input terminals constituted by pins #2 and #3, respectively, of the operational amplifier 32. The latter is a low cost, high gain differential operational amplifier, such as the general purpose type LM107 series commercially available from various manufacturers as Signetics Corporation, RCA or Texas Instruments, for example.

Such operational amplifiers are characterized by input configurations which can operate at signal levels at or near the operating supply voltage level of the amplifier and still provide an adequate amount of gain for signals differing by a few millivolts in level applied to the input terminals thereof. The input and output transistors of the LM107 series have their collector electrode directly connected to and are at the B+ operating supply level. Pins #7 and #4 are the operating potential terminals of the amplifier of which Pin #7 is connected internally of the controller to the controller input terminal #1 adjacent the side a of the sensor resistor 30. Pin #4 is connected to case ground through a resistor 46 having a resistance value of, say 1000 ohms. Pin #6 is the signal output terminal of the amplifier and is nearly at the potential level of the operating voltage supply under short circuited input or for a zero input voltage applied across its input terminals.

The ungrounded side of resistor 46 is connected to the anode of a Zener diode 50 whose cathode is connected between input terminal #1 of the controller and the side a of the sensor resistor 30. The ungrounded side of the resistor 46 is also connected through another diode 52 poled as shown to the collector electrode of the relay driver or output control transistor 34.

In accordance with the one aspect of the invention, the resistor 46, Zener diode 50, and diode 52 form a transient suppression circuit for protection of the operational amplifier 32 and the switching transistor 34 from the damaging effects of high voltage transients encountered on and presented to the current sensing line. Such transients may easily attain peak values in excess of 80 volts or so and are generated from various sources upon the de-energization of various electrical loads, as the air conditioner clutch, heater or blower motor, electrical windshield wipers, etc., while the engine is running. In the absence of proper suppression techniques or resort to expensive solid state components of special design to withstand such transients, the ordinary components employed herein would be destroyed.

The Zener diode 50 is a general purpose low cost Zener diode such as a type 1N4749 or equivalent components having a 24 volt, 1 watt rating and has its cathode connected essentially to the pin terminals 2 (3) and 7 of the OP AMP 32 and to the emitter of the transistor 34. The anode of the Zener diode is connected to the return terminal pin #4 of the OP-AMP. Thus, with an 80 volt positive going transient spike on the sensor line, the 24 v. Zener will break down to prevent the voltage between any of these points from exceeding 24 volts irrespective of the transient peak magnitude, and thus protects these components from breakdown. The 56 v. balance of the assumed 80 v. transient will be dropped across the current limiting resistor 46, in the absence of which the otherwise unlimited current through the Zener would destroy the Zener diode. It will be noted that there is an additional current path in parallel with the resistor 46 through the diode 52 and the relay coil 37 to ground. This circuit places the collector of the transistor at 55.4 volts due to the assumed 80 v. transient and limits the voltage across the output electrodes of the transistor to the 24 volt regulation level of the Zener, thereby affording similar circuit protection to the driver transistor for substantially all transients presented on the current sensing line.

It will be also noted that the relay coil 37 is connected across diode 52 and resistor 46. In this aspect, diode 52 serves to protect the output transistor 34 from the high inductive voltage surges generated upon de-energization of the relay coil 37 in addition to its function or cooperation with Zener diode 50 and resistor 46 to limit the voltage across the output transistor due to high voltage transients on the current sensing line.

Control transistor 34 may be a PNP general purpose transistor such as of the 2N4402 or equivalent variety, having emitter, base and collector electrodes of which the emitter electrode is connected with pin #7 of the operational amplifier 32 to the B+ supply voltage at the input terminal #1 of the controller and the collector electrode 34 is connected to the high potential or ungrounded side of the relay coil 36. The base electrode of the transistor is connected to the output terminal or pin #6 of the operational amplifier through another diode 54, which is poled as shown and provides an additional diode drop in the emitter base circuit path of the transistor to assure turn-off of the control transistor from the operational amplifier. Diodes 52 and 54 are low signal level, general purpose, low cost diodes such as type 1N4148 or equivalent.

The remaining components of the controller include the filter capacitor 56 and resistors 57 and 58 all of which are connected at one side to output pin #6 of the OP-AMP 32. Capacitor 56, which has a capacitance value of 0.033 ufd and resistor 57 are connected at their other side to the inverting (−) input terminal of the amplifier, while the other side of resistor 58 is connected to the return supply terminal pin #4 of the amplifier, as shown. Resistor 57 in conjunction with resistor 44 sets the closed loop gain of the amplifier 32 in accordance with the ratio of R57 to R44 having illustrative resistance values of 3 megohms and 10,000 ohms, respectively. Resistor 45 also has a value of 10,000 ohms and serves to balance the amplifier for the input bias currents, which are drawn by the transistors located internally thereof and are connected to the respective input terminals or pins 2 and 3 thereof. Resistor 58 has a resistance of 22,000 ohms and serves to reduce an undesired oscillatory condition encountered on turn on of the controller and tending to cause relay chatter. Capacitor C1 likewise prevents actuation of the relay from short transients on the current sensing line and reduces the reaction of the circuit to such transient noise by slowing the response of the circuit.

In describing the operation of the device, it will be assumed that the antenna is in its down or fully retracted position, that the ignition switch 12 is closed or ON, and that the radio 14 is OFF and is not drawing current from the potential source 16. The voltage level at the opposite sides a, b of the sensor resistor 30 will be equal and the voltage drop thereacross will be zero, so that a zero difference input signal is presented to the operational amplifier 32. The output terminal #6 of the operational amplifier will thus be at a high potential at or near the 12 volt level of the "rail" or pin #7 thereof. Diode 54 will be back-biased and prevent base current draw for transistor 34, which will therefore be OFF to prevent energization of the coil 37 of the relay 36 whose contacts will be in the position shown.

When the radio receiver load is turned ON, as by the ON-OFF power control switch 15 customarily provided on the audio volume control of the radio receiver, the latter will draw from the battery 16 through the sensor resistor 30 a current of a magnitude depending upon the setting of the gain attenuating or volume control. The controller is designed to respond to a minimum current draw of 40 milliamperes for most radio receivers and will develop a corresponding voltage drop in the direction of the arrow across the 0.25 ohm sensor resistor 30. The potential at point b of the sensor resistor will be at least 10 millivolts below the level at point a and of a sufficient level to operate the operational amplifier, while being of insignificant consequence to the 12 V. supply potential of the radio feed line to the receiver so as to present no effect upon the performance or operation of the latter due to the presence of the sensor resistor.

The signal voltage developed across the sensor resistor for the minimum current draw of the receiver is of such direction and magnitude and the gain of the OP-AMP is such as to cause the voltage level at output terminal pin #6 thereof to drop sufficiently to forward bias diode 54 and provide a base current path to turn on transistor 34 through pins #6 and #4 of the oprational amplifier and through resistor 46 to ground. With transistor 34 turned on, current is supplied from B+ through the emitter and collector output electrodes of the transistor to the relay coil 37, which will then transfer its movable contact 38 from the position shown to front contact 40. This connects the battery fed output terminal #3 of the controller to the "up" terminal #6 thereof, which is connected to the "up" field coil 22 of the drive motor 20 of the power antenna unit 18 through the closed limit switch 24 and thereby energize the motor to extend the antenna until the limit switch 24 opens to de-energize the drive motor. So long as the radio receiver 14 remains energized with the ON-OFF control 15 in the ON position and the ignition switch 12 is ON, the relay coil 37 remains energized and its contacts remain in the opposite position from that shown.

When the receiver 14 is turned OFF, as by turning off the ON-OFF control switch 15 thereof while the ignition switch 12 is still on, the voltage level at side b of the sensor resistor 30 goes up to attain the level at side a thereof, whereby the output of the operational amplifier at pin #6 goes up to back bias diode 54 and interrupt the base current drive for the transistor 34. Transistor 34 thus turns off to de-energize the relay coil 37 which transfers its contacts back to the position shown. The battery fed terminal #3 is swtiched to the back contact 39 of the relay connected to the "down" or #5 terminal of the controller, which is connected to the "down" field coil 21 of the antenna drive unit 18. This energizes the "down" field coil of the reversible drive motor 20 through the limit switch 23, which is closed when the antenna is in an extended position, and the motor is energized to rotate in the opposite direction and retract the antenna until such point as the limit switch 23 is opened and switch 24 is closed.

It will be appreciated that the same sequence of operations will take place with the radio receiver control 15 left in the ON position and the receiver energized and de-energized with the opening and closing of the ignition switch 12, the opening of which will remove the operating potential for the amplifier 32 and the transistor 34, which drops out the relay.

FIG. 2 illustrates a modification of the controller 10 for use with a bi-level energization form of utilization device which has a standby operating mode requiring a finite or first level of current to condition or prepare it for operation at a different and usually higher level of current upon subsequent activation of the device. Typical of such devices are electronic computers having volatile-type destructive memories which must be maintained in an energized condition even though the signal processing and computing sections of the computer are shut off. Another example, is an all electronic search tune radio having electronic-type logic and memory circuits which must be maintained in an energized condition when the ignition switch is ON, even though the frequency display, scanning and processing circuits of the receiver are shut-off. One form of such a receiver for which the controller modification of FIG. 2 is designed has an initial or minimum current draw in the standby operating mode of 270 milliamperes in the receiver OFF condition, while drawing 450 m.a. in the minimum volume, receiver ON condition.

The controller of FIG. 2 is designed to recognize or treat a current of 360 m.a., halfway between the 270 m.a. and the 450 m.a. current draw conditions of the electronic search tune receiver or bi-level energization form of utilization device, as the zero or threshold current sensing condition corresponding to the OFF or zero m.a. current draw condition of the conventional radio receiver or utilization device of FIG. 1.

With a 360 m.a. current flowing through the 0.25 ohm sensor resistor 30, a 90 mv drop will be developed thereacross. The compensating, bias or offset circuit constituted by the Zener diode 60 and resistors 62 and 64, connected as shown, cancels the effect of the 90 mv drop by offsetting the level of the input signal to pin #2 of the operational amplifier by the same amount. The circuit essentially subtracts or drops the input to pin #2 of the amplifier the same amount as the 90 m.v. drop produced across resistor 30 by the nominal working 360 m.a.

Zener diode 60 is a 5.1 volt Zener with a ½ watt rating with its cathode connected to the 12 v. B+ operating voltage level at the input of the controller and breaks down to supply a regulated 5.1 volts thereacross. The remaining voltage is dropped across current limiting resistor 64 which is connected to ground as shown. The 5.1 Zener voltage appears between points b and c and be impressed across the serially connected resistor 62, which has a resistance value of 590,000 ohms, and resistor 45, which has a resistance value of 10,000 ohms and forms a voltage burden therewith. Thus, the voltage at the divider junction c of the resistors 45 and 62 will be offset and at the same level at the inverting input terminal of the amplifier, as the 90 m.v. drop produced by the average 360 m.a. nominal working current across the sensor resistor 30 and presented to the non-inverting input terminal #3 of the amplifier 32. The amplifier will therefore discriminate against or be unresponsive to the 360 m.a. nominal working current draw through resistor 30 in the standby operating mode of the receiver and will treat this current as the offset or zero condition thereof so that when the search tune radio receiver is activated to draw the 450 m.a. current in the minimum volume condition thereof, the additional voltage drop produced across the sensor resistor will produce an output signal from the operational amplifier 32 to switch the control transistor 34 and operate the relay 36. Operation of the latter then operates the antenna control unit as previously described.

What is claimed is:

1. A solid state electronic current sensor and controller circuit for sensing the activation of a first utilization device electrically powered from a potential source and having a standby operating mode drawing a finite level of current conditioning it for operation at a higher level of current upon activation of said device, said controller controlling an operation of a second utilization device upon activation of the first device and comprising a first resistor adapted to be connected in series between one side of said potential source and said first utilization device;

a high gain, differential operational amplifier having a pair of signal input terminals connected across said first resistor, a signal output terminal and a pair of operating potential supply terminals including a high potential supply terminal and a supply return terminal of which the high potential terminal is connected to one side of said first resistor adjacent said source;

an electrical relay having a coil for connection at one side to the other side of said potential source and a set of switch contacts for connection to said second utilization device to control an operation thereof upon energization of said relay;

an output control transistor having an input control electrode coupled to the output terminal of said amplifier and a pair of output electrodes, one of which output electrodes is connected to the high potential supply terminal of said amplifier and the other output electrode is connected to the other side of said relay coil;

and offset, means connected to one of the input terminals of said operational amplifier for compensating the amplifier for the finite current drawn by said first electrical utilization device to prevent operation of said second device from said controller when the first device is in its standby operating mode.

2. A solid state electronic current sensor and controller in accordance with claim 1 above wherein said offset means injects a compensating signal voltage at one of the input terminals of the amplifier that is equal to the voltage drop across said first resistor due to the finite level of current drawn therethrough in the standby operating mode of the first utilization device.

3. A solid state electronic current sensor and controller in accordance with claim 1 above wherein said offset means injects a fixed biasing voltage at the said one of the input terminals of the amplifier.

4. A solid state electronic current sensor and controller in accordance with claim 3 above herewith said biasing means includes a first Zener diode and a second resistor connected in series from one side of said first resistor to the said one of the input terminals of said operational amplifier.

5. A solid state electronic current sensor and controller in accordance with claim 4 above, further including a suppression circuit for protection of the operational amplifier and said control transistor from high voltage transients presented to the input of the controller, including a second Zener diode connected between the said one side of said first resistor and the said return supply terminal of said operational amplifier and a third resistor connected between the return supply terminal of the amplifier and the said one side of said relay coil.

6. A solid state current sensor and controller circuit in accordance with claim 5 including a third diode connected between the control electrode of said output control transistor and the output terminal of said amplifier and poled to permit base current drive for said control transistor to flow through said amplifier and said third resistor when a signal voltage, which is developed across said first resistor upon the activation of said first utilization device and is greater than the signal voltage developed across the first resistor by the standby current drawn by said first utilization device in its standby operating mode, is presented to said operational amplifier.

7. A solid state current sensor and controller in accordance with claim 6 above including a fourth diode connected across the relay coil.

8. A solid state current sensor and controller in accordance with claim 5 above wherein said second Zener diode has a voltage rating at least equal to the potential of said source.

9. A solid state current sensor and controller in accordance with claim 5 above including a capacitor connected between the output terminal of said amplifier and the said one of the input terminals thereof.

10. A solid state current sensor and controller in accordance with claim 5 above including a fourth resistor and a fifth resistor for setting the gain of the operational amplifier of which the fourth resistor is connected between the said one of the input terminals of the operational amplifier and one side of the first resistor and of which the fifth resistor is connected between the output terminal of the operational amplifier and the said one of the input terminals thereof.

11. A solid state current sensor and controller in accordance with claim 10 above wherein said fifth resistor is several orders of magnitude greater than said fourth resistor.

12. A solid state electronic current sensor and controller in accordance with claim 10 above wherein the said one of the input terminals of the operational amplifier is the inverting input terminal thereof.

13. A solid state current sensor and controller in accordance with claim 10 including a capacitor connected in parallel with said fifth resistor.

14. A solid state sensor and controller in accordance with claim 13 above including a sixth resistor connected between the output terminal and the return supply terminal of the amplifier.

15. A solid state current sensor and controller in accordance with claim 14 including a seventh resistor connected from the said other side of said first resistor to the other input terminal of said operational amplifier.

16. A solid state current sensor and controller in accordance with claim 5, wherein said first utilization device is an electronic search tune automobile radio receiver and said second utilization device is a power driven antenna unit remotely located from said receiver and is adapted to be connected to said relay contacts of the controller for controlling the extension and retraction of the antenna unit from the energization and deenergization of the automobile radio receiver.

17. A solid state current sensor and controller in accordance with claim 16 wherein said power driven antenna unit includes a rotationally reversible electrical motor selectively energizable through an up field winding and a down field winding and wherein said relay contacts are adapted to connect said potential source to one of the field windings in one condition of energization of said relay coil and to the other field winding in the other condition of energization and the relay coil.

* * * * *